July 24, 1934.  T. FECKER  1,967,876
ELECTRIC VALVE CONVERTING APPARATUS
Filed Nov. 15, 1932
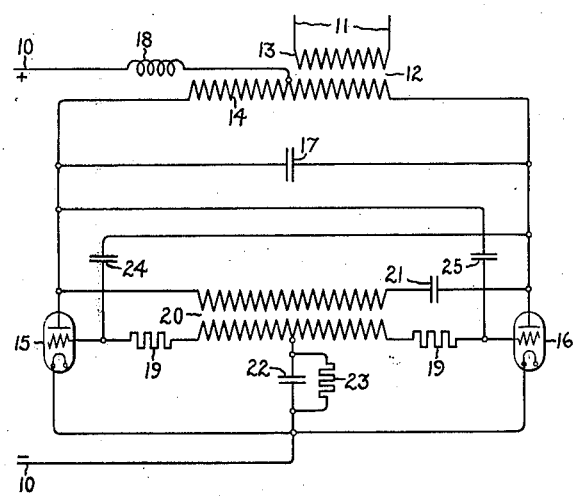
Inventor:
Theo Fecker,
by Charles E. Mullen
His Attorney.

Patented July 24, 1934

1,967,876

UNITED STATES PATENT OFFICE 1,967,876

ELECTRIC VALVE CONVERTING APPARATUS

Theo Fecker, Berlin-Reinickendorf, Germany, assignor to General Electric Company, a corporation of New York Application November 15, 1932, Serial No. 642,779
In Germany November 16, 1931

2 Claims. (Cl. 175—363)

My invention relates to electric valve converting apparatus and more particularly to such apparatus known in the art as a parallel inverter, and including vapor electric discharge valves.

There are now well known in the art several types of valve converting apparatus for transmitting energy between direct and alternating current circuits. Of these, the parallel inverter utilizing valves of the vapor electric discharge type has found particular favor because of the stability, high apparatus economy and efficiency. It is well understood that, in this type of apparatus, the current is commutated between the electric valves by forcing the anode potential of one of the valves negative with respect to its cathode for a short interval of time to interrupt the current therein and simultaneously making the grid negative to maintain the valve nonconductive for the succeeding half cycle. In order for the grid to maintain control over the conductivity of the valve, however, it is necessary for the valve to become deionized. Heretofore, there has been a rather definite frequency limitation upon the operation of parallel inverters utilizing vapor electric valves because of the fact that at the higher frequencies an insufficient time was available for deionizing the valves. In the copending application of M. M. Morack, Serial No. 626,789, filed July 30, 1932, and assigned to the same assignee as the present application, there are disclosed and claimed several arrangements for decreasing the deionization time of vapor electric valves utilized in a parallel inverter, and my present application constitutes an improvement upon the arrangements described in that application.

It is an object of my invention, therefore, to provide an improved valve converting apparatus of the parallel inverter type employing vapor electric valves which will overcome the above mentioned disadvantages of the arrangements of the prior art and which will be simple and reliable in operation.

It is another object of my invention to provide an improved electric valve converting apparatus of the parallel inverter type employing vapor electric valves in which the upper frequency limit of operation may be considerably extended.

In accordance with my invention, a parallel inverter including an inductive winding and a pair of grid controlled vapor electric valves is provided with a pair of capacitors, each connected to be charged with the potential across the inductive winding. Each of the capacitors is connected directly between the grid of one of the valves and the anode of the other valve so that during the commutating period when the second valve has started to conduct its capacitor is connected directly between the grid and cathode of the first valve. The result is that a high negative transient potential is impressed upon the grid of each of the valves during the commutating periods which is effective to rapidly deionize the valves.

For a better understanding of my invention, together with other and further objects thereof, reference is had to the following description taken in connection with the accompanying drawing and its scope will be pointed out in the appended claims. In the single figure of the drawing is illustrated a parallel inverter embodying my invention for securing a rapid deionization of the valves during the commutating periods.

Referring now to the drawing, there is illustrated an arrangement for transmitting energy from a direct current circuit 10 to an alternating current circuit 11 which may operate at a relatively high frequency. This apparatus comprises a transformer 12 provided with a secondary winding 13 connected in the circuit 11 and a primary winding 14 having an electrical midpoint connected to the positive side of the direct current circuit and end terminals connected to the negative side of the direct current circuit through electric valves 15 and 16. The valves 15 and 16 are each provided with an anode, a cathode and a control grid and are of the vapor electric discharge type in which the starting of current in a valve is controlled by the potential on its control grid but in which the current in the valve may be interrupted only by reducing its anode potential below the critical value. In case the alternating current circuit 11 is not provided with an independent source of electromotive force for commutating the current between the valves 15 and 16, a commutating capacitor 17 may be connected across the winding 14 as illustrated. A smoothing reactor 18 is preferably included in the direct current circuit.

In order periodically to render the valves 15 and 16 alternately conductive and nonconductive, the grids of these valves are connected to their respective cathodes through current limiting resistors 19 and opposite halves of the secondary winding of a grid transformer 20, the primary winding of which may be energized from any suitable source of alternating current of the frequency which it is desired to supply the circuit 11, or it may be connected directly across the winding 14 through a phase advancing condenser 21 as illustrated. In some cases it may be desirable also to include a biasing condenser 22 and high resistance leak 23 in the common portion of the grid circuits. The grid of each of the valves 15 and 16 is also directly connected to the anode of the other valve through one of the capacitors 24 and 25, respectively.

The general principles of operation of the above described inverter will be well understood by those skilled in the art. In brief, if one of the valves, for example valve 15, is initially rendered conductive, current will flow through the left hand portion of the winding 14 and electric valve 15, inducing one half cycle of alternating current in the transformer 12. During this interval the capacitor 17 becomes charged to the potential appearing across the winding 14 which is substantially twice that of the direct current circuit. When the grid potential supplied by the grid transformer 20 reverses polarity, rendering the valve 16 conductive, the potential of capacitor 17 is effective to initiate the current in the valve 16 and interrupt it in the valve 15 so that the current now flows through the right hand portion of the winding 14 inducing a half cycle of alternating current of opposite polarity in the transformer 12. In this manner the current is successively commutated between the valves 15 and 16 and alternating current supplied to the circuit 11.

As stated above, when the valve 16 is rendered conductive the capacitor 17 is effective to initiate the current in the valve 16 and interrupt that in the valve 15 by momentarily making the cathode of the valve 15 positive with respect to its anode. However, the capacitor 17 discharges relatively rapidly and will hold the cathode of the valve 15 positive with respect to its anode for only a very short interval. During this time it is necessary completely to deionize the valve 15 or, when the anode of the valve 15 again becomes positive, current will immediately restart in the valve 15 resulting in a short circuit on the direct current circuit 10. However, during the interval in which the capacitor 17 was being charged, capacitor 24 will become charged to an equal potential, since the valve 15 is conductive to connect its lower terminal to the lefthand terminal of the winding 14. When the valve 16 becomes conductive the full potential of the capacitor 24 is connected directly between the grid and the cathode of the valve 15 and is effective to deionize the valve 15 in an extremely short interval. Similarly, the capacitor 25 is effective to deionize the valve 16 during alternate commutating periods. In this manner the deionization time of the valves is materially shortened so that the commutating periods may be correspondingly shortened and the operating frequency of the apparatus substantially increased.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an inverter of the parallel type including an inductive winding, a pair of grid controlled vapor electric valves and a grid circuit for normally controlling the conductivity thereof, means for commutating the current between said valves, a pair of capacitors each connected to be charged with the potential across said winding, and a deionizing circuit for each of said valves consisting solely of the grid-cathode circuit of one of said valves, one of said capacitors, and the anode-cathode circuit of the other valve.

2. In combination, a direct current supply circuit, an alternating current load circuit comprising an inductive winding, a connection from said winding to one side of said direct current circuit, a pair of grid controlled vapor electric valves with their anodes connected to the terminals of said winding and their cathodes connected to the other side of the direct current circuit, a grid circuit for normally rendering said valves alternately conductive and nonconductive, means for commutating the current between said valves, and a deionizing circuit for each of said valves consisting of a capacitor directly interconnecting the grid of one of said valves with the anode of the other valve.

THEO FECKER.